US006765528B2

(12) United States Patent
Tranchina et al.

(10) Patent No.: US 6,765,528 B2
(45) Date of Patent: Jul. 20, 2004

(54) MOBILE RADIO WITH GPS CAPABILITY

(75) Inventors: James R. Tranchina, Dix Hills, NY (US); Kenneth Joseph Schaefer, Nesconset, NY (US)

(73) Assignee: Audiovox Corporation, Hauppauge, NY (US)

( * ) Notice: Subject to any disclaimer, the term of this patent is extended or adjusted under 35 U.S.C. 154(b) by 0 days.

(21) Appl. No.: 10/054,701

(22) Filed: Oct. 25, 2001

(65) Prior Publication Data

US 2003/0080897 A1 May 1, 2003

(51) Int. Cl.$^7$ .............................. G01S 5/02; H04B 7/185
(52) U.S. Cl. .............................. 342/357.1; 342/357.13; 701/209; 701/3
(58) Field of Search ........................ 342/357.09, 357.1, 342/357.13; 701/300, 215, 209, 301, 302

(56) References Cited

U.S. PATENT DOCUMENTS

| | | | | |
|---|---|---|---|---|
| 5,422,816 A | * | 6/1995 | Sprague et al. ............. | 342/450 |
| 5,434,789 A | * | 7/1995 | Fraker et al. | |
| 5,502,446 A | * | 3/1996 | Denninger ................... | 342/452 |
| 5,781,150 A | * | 7/1998 | Norris ......................... | 342/419 |
| 5,797,091 A | | 8/1998 | Clise et al. | |
| 5,884,199 A | * | 3/1999 | Maki .......................... | 455/575 |
| 5,919,239 A | * | 7/1999 | Fraker et al. ............... | 342/457 |
| 6,236,365 B1 | * | 5/2001 | LeBlanc et al. ............. | 342/457 |
| 6,297,781 B1 | | 10/2001 | Turnbull et al. | |
| 6,492,941 B1 | * | 12/2002 | Beason et al. ........... | 342/357.1 |
| 6,529,831 B1 | * | 3/2003 | Smith et al. ................ | 701/301 |

FOREIGN PATENT DOCUMENTS

| | | |
|---|---|---|
| EP | 1 132713 A1 | 9/2001 |
| EP | 1132713 | 9/2001 |
| JP | 08349141 | 12/1996 |
| JP | 10185610 | 7/1998 |
| JP | 11275600 | 9/1999 |
| JP | 2001 102995 | 4/2001 |

OTHER PUBLICATIONS

PCT International Search Report.
*English Abstract.
*English Abstract.
International Search Report.

* cited by examiner

Primary Examiner—Theodore M. Blum
(74) Attorney, Agent, or Firm—F. Chau & Associates, LLC

(57) ABSTRACT

There is provided a mobile radio with Global Positioning System (GPS) capability. The mobile radio with GPS capability includes a GPS receiver and a mobile radio transceiver. The GPS receiver receives position information from GPS satellites for presentation to a user of the mobile radio. The mobile radio transceiver transmits and receives radio frequency (RF) signals. The RF signals include at least one of speech and the position information.

34 Claims, 2 Drawing Sheets

MOBILE RADIO WITH GPS CAPABILITY

TECHNICAL FIELD

The present invention relates generally to mobile radios and global positioning systems and, in particular, to a mobile radio with global positioning system capability.

BACKGROUND DESCRIPTION

GPS is a world-wide radio navigation system formed by a group of 24 satellites and their associated ground stations. GPS uses these satellites, appropriately called NAVSTAR (Navigation Satellite Timing and Ranging), to calculate ground positions. The basis of GPS operation is the use of triangulation from the satellites. To triangulate, a GPS receiver measures distance using the travel time of radio signals. However, to measure travel time, GPS needs very accurate timing, plus it needs to know exactly where the satellites are in space. To solve this problem, each of the 24 satellites is inserted into a high enough orbit (12,000 miles) to preclude interference from other objects, both man-made and natural, and to insure overlapping coverage on the ground so that a GPS receiver can always receive from at least four of them at any given time. In addition, compensation is inserted for any delay the signal experiences as it travels through the atmosphere to the receiver.

With the satellites operating at 12,000 miles above the earth's surface, they are arranged in strategic positions and orbit the earth every 12 hours. Each satellite transmits a low-power radio signal in the UHF frequency range; the frequencies used are designated as L1, L2, and so forth. GPS receivers listen on the L1 frequency of 1575.42 MHZ. This signal, since it is line-of-sight, will reach the ground receiver unless it is obstructed by solid objects, such as buildings and mountains.

The L1 signal is accompanied by a pair of pseudo-random signals (referred to as pseudo-random code) which is unique to each satellite. These codes are identified by the GPS receiver and allow for the calculation of the travel time from the satellite to the ground. If this travel time is multiplied by the speed of light, the result is the satellite range (distance from satellite to receiver). The navigation information provided by each satellite consists of orbital and clock data, plus delay information based on an ionospheric model. Signal timing is provided by highly accurate atomic clocks. The GPS receiver uses NAVSTAR satellite signals as a way of determining exact position on earth. Exemplary uses of GPS include security, emergency response, travel guidance, and so forth.

Mobile radios, such as for example those that operate in accordance with the General Mobile Radio Service (GMRS) and Family Radio Service (FRS), are becoming increasingly popular. Such mobile radios can be used to communicate, for example, when vacationing, hiking, biking, walking, driving, hunting, fishing, and so forth.

GMRS and FRS are two-way voice communication services. GMRS includes 23 channels, and FRS includes 14 channels. The first seven GMRS channels are on the same frequencies as the first seven FRS channels. Thus, the user of a GMRS mobile radio can communicate with the user of a FRS mobile radio, but only on the first seven GMRS channels. While GMRS requires a license from the Federal Communication Commission, FRS does not.

GMRS and FRS are only two of many radio services. For example, there are six Citizen Band Radio Services including FRS.

However, while handheld GPS devices and mobile radios provide useful features and services to users of the same, there is still a need for a mobile radio that can communicate its position (and hence the position of its user) to other, similar devices.

SUMMARY OF THE INVENTION

The problems stated above, as well as other related problems of the prior art, are solved by the present invention, a mobile radio with global positioning system capability.

According to an aspect of the present invention, there is provided a mobile radio with Global Positioning System (GPS) capability. A GPS receiver receives position information from GPS satellites for presentation to a user of the mobile radio. A mobile radio transceiver transmits and receives radio frequency (RF) signals. The RF signals include at least one of speech and the position information.

According to another aspect of the present invention, the mobile radio further comprises a user input device for selecting between a mobile radio mode, a GPS mode, and a mobile radio with GPS mode.

According to yet another aspect of the present invention, the mobile radio transceiver transmits an utterance of a user of the mobile radio to at least one other mobile radio with GPS capability.

According to still yet another aspect of the present invention, the mobile radio transceiver transmits an utterance of a user of the mobile radio to at least one other mobile radio without GPS capability.

These and other aspects, features and advantages of the present invention will become apparent from the following detailed description of preferred embodiments, which is to be read in connection with the accompanying drawings.

DETAILED DESCRIPTION OF PREFERRED EMBODIMENTS

Figure 1:
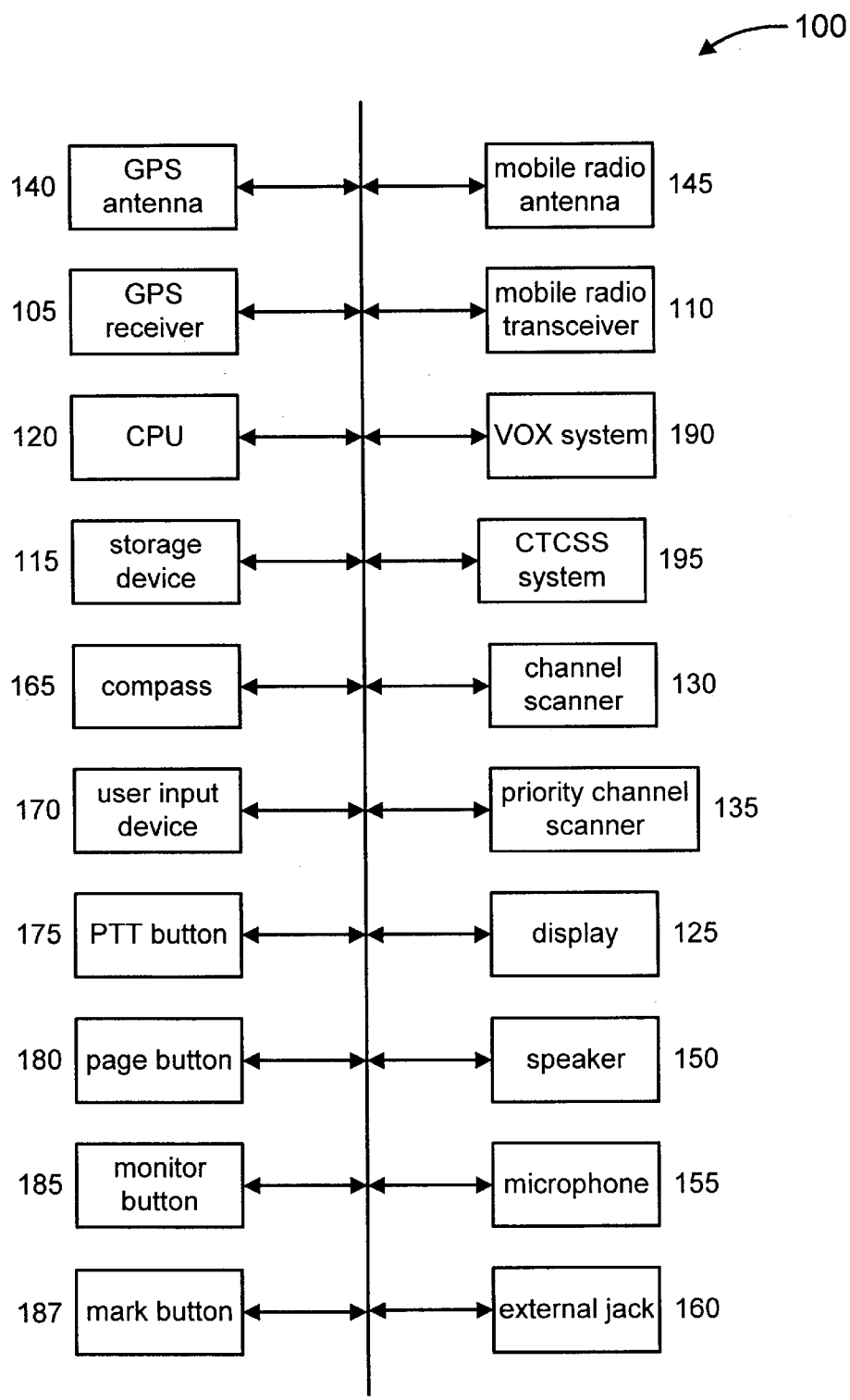
FIG. 1 is a block diagram illustrating a mobile radio 100 having Global Positioning System (GPS) capability, according to an illustrative embodiment of the present invention.

It is to be understood that the present invention may be implemented in various forms of hardware, software, firmware, special purpose processors, or a combination thereof. Preferably, the present invention is implemented as a combination of both hardware and software, the software being an application program tangibly embodied on a program storage device. The application program may be uploaded to, and executed by, a machine comprising any suitable architecture. The machine may be implemented on a computer platform having hardware such as one or more central processing units (CPU), a random access memory (RAM), and input/output (I/O) interface(s). The computer platform may also include an operating system and microinstruction code. The various processes and functions described herein may either be part of the microinstruction code or part of the application program (or a combination thereof) which is executed via the operating system. In addition, various other peripheral devices may be connected to the computer platform such as an additional data storage device.

It is to be further understood that, because some of the constituent system components depicted in the accompanying Figures may be implemented in software, the actual connections between the system components may differ depending upon the manner in which the present invention is programmed. Given the teachings herein, one of ordinary skill in the related art will be able to contemplate these and similar implementations or configurations of the present invention.

To facilitate a clear understanding of the present invention, a brief description of the invention will now be given, followed by a more detailed description with respect to FIGS. 1–2.

The present invention is directed to a mobile radio with a GPS capability. The mobile radio may or may not employ a known radio service. In the former case, the mobile radio may employ any type of radio services such as, for example, General Mobile Radio Service (GMRS), Family Radio Service (FRS), and so forth. It is to be appreciated that the preceding list of radio services is merely illustrative and, thus, other types of radio services may be employed while maintaining the spirit and scope of the present invention.

The present invention, in combining a mobile radio with GPS functions, allows for the transmission of position information of one or more users of a mobile radio to one or more other users. As used herein, the phrase "position information" refers to any information corresponding to GPS that may be used to determine the position of one or more individuals. Moreover, in some embodiments of the present invention, the phrase "position information" may also include other information corresponding to or derived from GPS data that may be used to characterize or quantify a parameter or function (hereinafter "function") related to travel/navigation. Such functions may include current/average/maximum speed, bearing and heading, date and time, sunrise and sunset, odometer data, trip time, and so forth. It is to be appreciated that the preceding list of functions is merely illustrative and, thus, other functions associated with GPS and travel/navigation, as readily contemplated by one of ordinary skill in the related art, may be used while maintaining the spirit and scope of the present invention. It is to be appreciated that the phrase "position information" is intended to include both unprocessed data provided from NAVSTAR (GPS) satellites as well as processed data (e.g., NAVSTAR originated data processed by a mobile radio according to the present invention). It is to be further appreciated that the phrases "position information" and "navigation related data" are used interchangeably herein.

Many attendant benefits and advantages may be obtained by communicating position information according to the present invention. For example, a group of hunters will each know where the others in the group are and can decide whether to shoot in a given direction based on the position information (i.e., user wants to shoot due North in the direction of a deer, but other hunter is located due North, so the shot should not be taken). As is readily ascertainable, there are many uses for such information (e.g., locating a lost child). Moreover, from the position information of another user, other useful information can be determined such as, for example, the intended route of the other user, a route to the other user, how long it will take you to arrive at the other user's position, and so forth. The preceding list is merely illustrative and, thus, other relevant information may also be determined from the position information of another user, as readily ascertained by one of ordinary skill in the related art, while maintaining the spirit and scope of the present invention.

It is to be appreciated that the mobile radio functions of the mobile radio of the present invention may be used to communicate with other mobile radio users, irrespective of if the other mobile radios have GPS capability. The latter only need be able to communicate on the same frequency band(s). Thus, for example, if a mobile radio according to an illustrative embodiment of the present invention operates using the General Mobile Radio Service (GMRS), then that mobile radio could communicate with another mobile radio that operates using the GMRS irrespective of whether the other radio has GPS capability.

FIG. 1 is a block diagram illustrating a mobile radio 100 having Global Positioning System (GPS) capability, according to an illustrative embodiment of the present invention. The mobile radio 100 includes: a GPS receiver 105; a mobile radio transceiver 110; at least one storage device (hereinafter referred to as "storage device" 115); at least one central processing unit (hereinafter referred to as "CPU" 120); a display 125; a channel scanner 130; a priority channel scanner 135, a GPS antenna 140; a mobile radio antenna 145; a speaker 150; a microphone 155; an external speaker/microphone jack 160; a compass 165; at least one user input device (hereinafter referred to as "user input device" 170); a Push-To-Talk (PTT) button 175; a page button 180; a monitor button 185; a mark button 187; a Voice-Operated Transmission (VOX) system 190; a Coded Tone Controlled Squelch System (CTCSS) 195; a power on/off button (not shown); an AC/DC adapter (no shown); an enclosure (not shown); a battery compartment (not shown); battery charging contacts (not shown); and a belt clip and belt clip screw not shown).

It is to be appreciated that the functions performed by the compass 165, the user input device 170, the PTT button 175, the page button 180, the monitor button 185, and the mark button 187 may all be performed by a single input device (or, at the least, less than those specified above, however, more can also be used) such as the user input device 170. In such a case, the user input device 170 should allow for the selection and/or input of data (optionally, but preferably using a menu system), and should be in the form of, for example, a joystick, a wheel, and so forth. In the case of wheel, the wheel may be a spring-loaded, center position switch or similar device. A user rotates the wheel to go through the various selection options and then presses the wheel to make an actual selection. The previous examples of user input devices (165, 170, 175, 180, 185 and 187) are merely illustrative and, thus, other types of user input devices may be employed while maintaining the spirit and scope of the present invention.

The GPS receiver 105 receives NAVSTAR satellite signals, which are used to determine earth position. The overall operation of GPS, and the functions of a GPS receiver are described above. Moreover, since the operation of a GPS receiver is well known to one of ordinary skill in the related art, further description thereof is omitted for the purpose of brevity.

The mobile radio transceiver 110 transmits and receives radio frequency (RF) signals to other mobile radios, including those with and without GPS capability. It is to be appreciated that the mobile radio transceiver 110 may be replaced by a mobile radio transmitter and a mobile radio receiver. In such a case, the functions of transmitting and receiving would be respectively and separately performed by the transmitter and the receiver.

The storage device 115 stores data relating to navigation and communication. For example, the storage device 115 may store waypoints, routes, tracks, marks, positions (e.g., coordinates), user IDs, audio data, and so forth.

Waypoints are coordinates of user-selected specific geographical or man-made objects along a traveled route. Geographical objects could be a lake, pond, hill, and so forth. Man-made objects could be a barn, house, electric tower, and so forth.

Routes consist of two or more waypoints that define a path to a destination. Using a route feature, a user may be guided from the first waypoint in the route to each successive waypoint until the trip is completed.

As a user travels during a trip, using the waypoints as guideposts, the user will leave a trail or track. The track consists of waypoints that were generated automatically by the mobile radio 100 as the user traveled. This track can be used later when the user returns from the trip.

A mark is a location of the user of the mobile radio 100. This location can be sent to other mobile radios with GPS capability.

As noted above, the CPU 120 may be one or more processors. The CPU 120 may used to perform functions such as, for example, calculating current/average/maximum speed, bearing and heading, date and time, sunrise and sunset, odometer data, trip time, and so forth. It is to be appreciated that the preceding list of functions is merely illustrative and, thus, other functions associated with such a device, as readily contemplated by one of ordinary skill in the related art, may be performed by the CPU 120 while maintaining the spirit and scope of the present invention. In some cases, the functions may be implemented by the CPU 120 in conjunction with the storage device 115, the latter of which may store computer program code for implementing the functions. Moreover, in some cases, the functions may be dependent upon position and related data provided by the one or more NAVSTAR satellites or by other mobile radios with GPS capability.

It is to be appreciated that the display 125 is not limited to any particular kind of display. Accordingly, displays may be used which include, but are not limited to, liquid crystal displays (LCDs), light emitting diodes (LEDs), and gas plasma. It is to further appreciated that any variations of the aforementioned types of displays may be used. For example, with respect to liquid crystal displays, active matrix (e.g., thin film transistor) technology or passive matrix (e.g., dual scan) technology may be employed. The display may also employ touch screen technology, so that users can interact with the mobile radio by either touching the screen or placing a specified device (e.g., electrostatic pen) near the screen. In a preferred embodiment of the invention, a liquid crystal display (LCD) is employed which uses active matrix technology. Moreover, in the preferred embodiment, the LCD is backlit for night or low light operation.

The channel scanner 130 automatically monitors all channels for valid signals. While scanning, a user can transmit and receive. When a signal is received, the scan is interrupted and will return to scan mode a predetermined time (e.g., 5 seconds) after reception has terminated.

The priority channel scanner 135 monitors two channels at the same time. While in priority scan mode, the mobile radio 100 will continuously monitor both a primary channel as well as a user-selected secondary channel. Received signals will be played for a predetermined time period (5 seconds) and then the mobile radio 100 will resume scanning the two channels. Pressing the PTT button 175 during a received transmission will set the mobile radio 100 to transmit on the same channel. Pressing the PTT button 175 when no signal is received will set the mobile radio 100 to transmit on the primary channel. While the channel scanner 130 and the priority channel scanner 135 are shown herein as separate elements of mobile radio 100, it is preferable that the channel scanner 130 and the priority channel scanner 135 be incorporated as part of the mobile radio transceiver 110.

The GPS antenna 140 is used to receive signals from the NAVSTAR satellites. The mobile radio antenna 145 is used to transmit and receive RF signals to and from other mobile radios, respectively. The RF signals may include position information (e.g., coordinates of another user) and communication data (e.g., audio conversation). Of course, a single antenna capable of receiving signals from the NAVSTAR satellites as well as transmitting and receiving signals to and from other mobile radios may be employed in place of antennas 140 and 145.

The speaker 150 reproduces audio data such as, for example, speech data of another user of another mobile radio (with or without GPS capability).

The microphone 155 is used to input audio data to the mobile radio 100. The audio data may then be transmitted to another user of another mobile radio by the mobile radio transceiver 110 through the mobile radio antenna 145.

The external speaker/microphone jack 160 may be used to connect an external speaker and/or microphone to the mobile radio 100. For example, a headset/microphone unit may be coupled to the external speaker/microphone jack 160.

The user input device 170 is used to input data. In the illustrative embodiment, the user input device inputs data other than that input through any of the other input devices (buttons, switches, and so forth). For example, the user input device 170 may be used to select a user ID for identifying a current user of the mobile radio, or for changing the volume of the sound emanating from the speaker 150. Of course, in other embodiments, the same type of data may be entered using more than one input device (for example, two separate buttons may each independently be used to activate and/or scroll through the menu function). Given the teachings of the present invention provided herein, one of ordinary skill in the related art will contemplate these and various other types of input devices, as well as other configurations thereof, while maintaining the spirit and scope of the present invention.

The Push-To-Talk (PTT) button 175 allows the user of the mobile radio 100 to converse with another user of another mobile radio (with or without GPS capability) that is on the same channel (and optionally, a same privacy code setting).

The PTT button 175 may also be used as a two-way call ringer. Pressing the PTT button 175 twice will call another party on the same channel.

The page button 180 allows the user of the mobile radio to page through a variety of GPS functions. For example, in an illustrative embodiment of the present invention, there are five main pages, as follows: a Standby page (one for each mode of the mobile radio 100, i.e., radio with GPS, radio only, GPS only); a Map page (presents a picture of where the user is going); a Pointer page (shows direction of user, when user is moving with no particular endpoint or target destination in mind); a GPS Menu page (provides means for navigating to the destination chosen by the user), and a Setup page (for configuring options).

In particular, the standby page displays the user ID, and the number of satellites acquired. Moreover, the standby page allows a user to enter the mobile radio function edit mode and to select a mobile channel and (optional) subcode.

The map page displays the North pointer and map scale. Moreover, the map page includes an option menu that allows a user to enter the options menu to turn symbols on/off, start a new trip, save a track, auto/manual zoom. The center of any displayed map is changed according to the user's movement. A symbol is used on the map to represent the user.

The pointer page displays current/average/maximum speed, bearing and heading, date and time, sunrise and sunset, odometer data, trip time, and so forth. Moreover, the pointer page includes an option menu that allows a user to reset a trip, start a new trip, reset a maximum speed, and so forth.

The mobile radio 100 may also include a mark waypoint page, a waypoints page, a routes page and a tracks page. The mark waypoint displays waypoint symbols, names, and locations, which can be edited. The waypoints page includes a waypoint edit function and a map function, and allows for saving and sending of position information. The routes page includes a routes edit function, a Goto (a particular route) function and a map function. The tracks page includes tracks search/edit, map, backtrack, and delete functions.

It is to be appreciated that the preceding page types and information/features/functions associated therewith are merely illustrative and, thus, new pages and associated information/features/functions may be added and existing pages and associated information/features/functions may be deleted or substituted, while maintaining the spirit and scope of the present invention.

The monitor button 185 is used to check activity on the current frequency before transmitting. The mark button 187 is used to mark the current position (position information) for saving purposes or for transmitting the current position to another mobile radio.

The functions of the power on/off button, the AC/DC adapter, the enclosure, the battery compartment, the battery charging contacts, the belt clip and the belt clip screw are well known to those of ordinary skill in the related art and are thus not further described herein for purposes of brevity. While the mobile radio unit 100 is described herein to include the power on/off button, the mobile radio 100 may also include an automatic shut-off, whereby the mobile radio 100 may automatically shut off after non-use that exceeds a predefined time threshold.

The VOX system 190 allows for voice-operated transmissions. While the VOX system 190 is shown herein as a separate element of the mobile radio 100, it is preferable that the VOX system 190 is incorporated as part of the mobile radio transceiver 110.

The CTCSS system 195 includes a plurality of sub-frequencies (e.g., 38). The CTCSS system 195 allows a user to utilize the coded squelch tones (e.g., 01–38) within a main channel. This enables the user to communicate with another party on the same main channel using the same subcode. This filters out unwanted transmissions without the same coded squelch tone. The mobile radio 100 may be used with other mobile radios that do or do not have subcodes. In the latter case, the subcode is set to 00.

A further description of the feature of the mobile radio 100 that allows for locating another user of another mobile radio with GPS capability will now be given with respect to FIG. 2.

Figure 2:
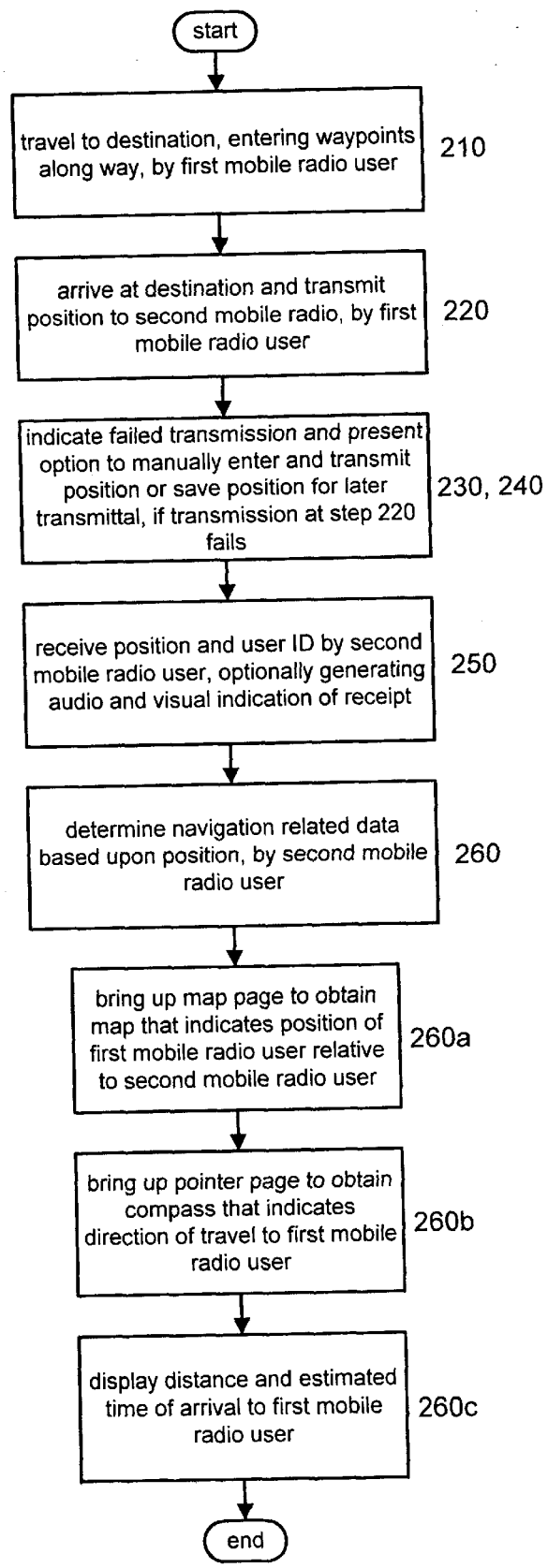
FIG. 2 is a flow diagram illustrating a method for communicating position information from a first mobile radio with GPS capability to a second mobile radio with GPS capability, according to an illustrative embodiment of the present invention.

FIG. 2 is a flow diagram illustrating a method for communicating position information from a first mobile radio with GPS capability (hereinafter "first mobile radio with GPS") to a second mobile radio with GPS capability (hereinafter "second mobile radio with GPS"), according to an illustrative embodiment of the present invention.

A user of the first mobile radio with GPS travels to a destination, optionally entering a few waypoints into the first mobile radio with GPS along the way to the destination (step 210). When the user of the first mobile radio with GPS arrives at the destination, he or she enters the destination into the first mobile radio with GPS and then transmits the position information (longitude and latitude) of the destination to the user of the second mobile radio with GPS (step 220). The transmission is initiated upon the actuation of the mark button 187.

If the satellite signal is lost prior to the user of the first mobile radio with GPS transmitting the position information at step 220, then a failed transmission condition is indicated to the user of the first mobile radio with GPS (step 230). In such a case, the user of the first mobile radio with GPS is presented with the option of manually entering and transmitting the position information, or saving the position information for subsequent transmission (step 240). For the purpose of illustration, it is presumed that the user of the first mobile radio with GPS transmitted the position information (either automatically or manually).

The user of the second mobile radio with GPS then receives the position information, along with a user ID that identifies the user of the first mobile radio with GPS (step 250). Step 250 may include the generation of a sound (audio indication) and a symbol (visual indication) by the second mobile radio with GPS to indicate the receipt of position information from another mobile radio (i.e., the first mobile radio with GPS).

The user of the second mobile radio with GPS then determines navigation related data, based upon the position information received from the user of the first mobile radio with GPS (step 260).

For example, the user of the second mobile radio with GPS may bring up the map page, which provides a map indicating the position of the user of the first mobile radio with GPS relative to the position of the user of the second mobile radio with GPS (step 260$a$). The user of the second mobile radio with GPS may then bring up the pointer page, which automatically brings up the compass to display the direction of travel to the user of the first mobile radio with GPS (step 260$b$). Further, upon walking a predetermined minimum distance toward the destination of the user of the first mobile radio with GPS, the distance and estimated time of arrival (ETA) are displayed to the user of the second mobile radio with GPS (step 260$c$). The preceding examples of navigation related data determined at step 260 (e.g., 260$a$–$c$) are merely illustrative of some of the many navigation related data than can be determined from the position information. Accordingly, given the teachings of the present invention provided herein, one of ordinary skill in the related art will contemplate these and various other navigation related data, while maintaining the spirit and scope of the present invention.

Thus, the present invention advantageously provides a mobile radio with GPS capability, the mobile radio able to communicate position information to other mobile radios with GPS capability. In this way, individuals on a joint excursion (hunting, camping, hiking, driving, skiing, and so forth), may readily communicate as well as locate their co-adventurers.

Although the illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A mobile radio with Global Positioning System (GPS) capability, comprising:
   a GPS receiver for receiving position information from GPS satellites for presentation to a user of the mobile radio;
   a central processing unit;
   a mobile radio transceiver for transmitting and receiving radio frequency (RF) signals, the RF signals including at least one of speech and the position information, wherein the mobile radio transceiver receives the position information of at least one other mobile radio with GPS capability and the central processing unit determines an estimated time of arrival of a user of the mobile radio to a destination of the at least one other mobile radio with GPS capability, based upon the position information of the at least one other mobile radio with GPS capability; and
   a channel scanner for scanning a plurality of channels for the RF signals including at least one of the speech and the position information.

2. The mobile radio of claim 1, further comprising a user input device for selecting between a mobile radio mode, a GPS mode, and a mobile radio with GPS mode.

3. The mobile radio of claim 1, wherein the mobile radio transceiver transmits an utterance of a user of the mobile radio to at least one other mobile radio with GPS capability.

4. The mobile radio of claim 1, wherein the mobile radio transceiver transmits an utterance of a user of the mobile radio to at least one other mobile radio without GPS capability.

5. The mobile radio of claim 1, wherein the mobile radio transceiver receives an utterance of a user of at least one other mobile radio with GPS capability.

6. The mobile radio of claim 1, wherein the mobile radio transceiver receives an utterance of a user of at least one other mobile radio without GPS capability.

7. The mobile radio of claim 1, wherein the mobile radio transceiver transmits the position information of the mobile radio to at least one other mobile radio with GPS capability.

8. The mobile radio of claim 1, further comprising a storage device for storing at least the position information of the at least one other mobile radio with GPS capability.

9. The mobile radio of claim 1, further comprising a storage device for storing at least the position information of the mobile radio.

10. The mobile radio of claim 1, wherein the central processing unit determines an intended route of a user of the at least one other mobile radio with GPS capability, based upon the position information of the at least one other mobile radio with GPS capability.

11. The mobile radio of claim 1, wherein the central processing unit determines a route to a user of the at least one other mobile radio with GPS capability, based upon the position information of the at least one other mobile radio with GPS capability.

12. The mobile radio of claim 1, wherein the central processing unit determines a heading of the at least one other mobile radio with GPS capability, based upon the position information of the at least one other mobile radio with GPS capability.

13. The mobile radio of claim 1, wherein the central processing unit determines a bearing of the at least one other mobile radio with GPS capability, based upon the position information of the at least one other mobile radio with GPS capability.

14. The mobile radio of claim 1, further comprising a user input device for selecting a user ID that identifies a user of the mobile radio.

15. The mobile radio of claim 1, further comprising a user input device for selecting a user ID that identifies a user of the mobile radio, and wherein the mobile radio transceiver transmits, to at least one other mobile radio with GPS capability, the user ID of the user of the mobile radio along with the position information of the mobile radio.

16. The mobile radio of claim 1, further comprising a user input device for selecting a user ID that identifies a user of the mobile radio, and wherein the mobile radio transceiver receives, from at least one other mobile radio with GPS capability, a user ID of a user of the at least one other mobile radio with GPS capability along with the position information of the at least one other mobile radio with GPS capability.

17. The mobile radio of claim 7, further comprising a user input device for controlling the mobile radio transceiver to transmit the position information of the mobile radio to the at least one other mobile radio with GPS capability, based upon a single user action.

18. The mobile radio of claim 1, further comprising a Coded Tone Controlled Squelch System (CTCSS).

19. The mobile radio of claim 1, wherein the mobile radio transceiver communicates using Voice-Operated Transmission (VOX).

20. The mobile radio of claim 1, wherein the mobile radio transceiver is capable of transmitting and receiving the RF signals including at least one of the position information and the speech information at a same time the channel scanner performs scanning.

21. The mobile radio of claim 1, wherein:
   the plurality of channels includes at least a primary channel and at least one other channel; and
   the at least one other channel is selected by a user of the mobile radio.

22. The mobile radio of claim 1, wherein the scanning is interrupted for a predetermined time when the mobile radio transceiver receives at least one of the RF signals.

23. The mobile radio of claim 1, wherein the mobile radio transceiver transmits and receives using at least some General Mobile Radio Service (GMRS) channels.

24. The mobile radio of claim 1, wherein the mobile radio transceiver transmits and receives using at least some Family Radio Service (FRS) channels.

25. A mobile communication and navigation device, comprising:
   a Global Positioning System (GPS) receiver for receiving position information from GPS satellites;
   a central processing unit;
   a mobile radio transmitter for transmitting radio frequency (RF) communications;
   a mobile radio receiver for receiving the RF communications, wherein the RF communications include speech and the position information of at least one of the mobile communication and navigation device and other mobile communication and navigation devices, and wherein the central processing unit determines an estimated time of arrival of a user of the mobile communication and navigation device to a destination of the other mobile communication and navigation devices, based upon the position information of the other mobile communication and navigation device; and a channel scanner for scanning a plurality of channels for the RF communications including at least one of the speech and the position information.

26. A method for communicating position information between mobile radios having GPS capability, comprising the steps of:

receiving the position information from at least three GPS satellites, by a first mobile radio having GPS capability;

transmitting the position information to a second mobile radio having the GPS capability, by the first mobile radio having GPS capability;

determining an estimated time of arrival of a user of the second mobile radio having GPS capability to a destination of the first mobile radio having GPS capability, based upon the position information transmitted to the second mobile radio having GPS capability; and scanning, by the second mobile radio having GPS capability, a plurality of channels for signals including the position information and speech information while simultaneously receiving the position information from the first mobile radio having GPS capability.

27. The method of claim 26, wherein said transmitting step further comprises the step transmitting, along with the position information, a user ID that identifies the user of the first mobile radio having GPS capability.

28. The method of claim 26, further comprising the step of determining an intended route of a user of the first mobile radio having GPS capability by the second mobile radio having GPS capability, based upon the position information transmitted to the second mobile radio having GPS capability.

29. The method of claim 26, further comprising the step of determining a route to a user of the first mobile radio having GPS capability by the second mobile radio having GPS capability, based upon the position information transmitted to the second mobile radio having GPS capability.

30. The method of claim 26, further comprising the step of determining a heading of the first mobile radio having GPS capability, based upon the position information transmitted to the second mobile radio having GPS capability.

31. The method of claim 26, further comprising the step of determining a bearing of the first mobile radio having GPS capability, based upon the position information of the at least one other mobile radio with GPS capability.

32. A mobile radio with Global Positioning System (GPS) capability, comprising:

a GPS receiver for receiving position information from GPS satellites for presentation to a user of the mobile radio;

a central processing unit;

a mobile radio transceiver for transmitting and receiving radio frequency (RF) signals, the RF signals including at least one of speech and the position information, wherein the mobile radio transceiver receives the position information of at least one other mobile radio with GPS capability and the central processing unit determines a route to a user of the at least one other mobile radio with GPS capability, based upon the position information of the at least one other mobile radio with GPS capability; and a channel scanner for scanning a plurality of channels for the RF signals including at least one of the speech and the position information.

33. A mobile communication and navigation device, comprising:

a Global Positioning System (GPS) receiver for receiving position information from GPS satellites;

a central processing unit;

a mobile radio transmitter for transmitting radio frequency (RF) communications;

a mobile radio receiver for receiving the RF communications, wherein the RF communications include speech and the position information of at least one of the mobile communication and navigation device and other mobile communication and navigation devices, and wherein the central processing unit determines a route to a user of at least one of the other mobile communication and navigation devices, based upon the position information of the at least one of the other mobile communication and navigation device; and a channel scanner for scanning a plurality of channels for the RF communications including at least one of the speech and the position information.

34. A method for communicating position information between mobile radios having GPS capability, comprising the steps of:

receiving the position information from at least three GPS satellites, by a first mobile radio having GPS capability;

transmitting the position information to a second mobile radio having the GPS capability, by the first mobile radio having GPS capability;

determining a route to a user of the first mobile radio having GPS capability by the second mobile radio having GPS capability, based upon the position information transmitted to the second mobile radio having GPS capability; and scanning, by the second mobile radio having GPS capability, a plurality of channels for signals including the position information and speech information while simultaneously receiving the position information from the first mobile radio having GPS capability.

* * * * *